United States Patent [15] 3,681,411
Crabbe et al. [45] Aug. 1, 1972

[54] PREPARATION OF 17ALPHA PROPADIENYL STEROIDS

[72] Inventors: Pierre Crabbe, Mexico City, Mexico; John H. Fried, Palo Alto, Calif.

[73] Assignee: Syntex Corporation, Apartado, Panama

[22] Filed: Dec. 29, 1970

[21] Appl. No.: 102,503

Related U.S. Application Data

[63] Continuation-in-part of Ser. No. 817,526, April 18, 1969.

[52] U.S. Cl......260/397.4, 260/397.5, 260/239.55 R
[51] Int. Cl..............................................C07c 169/20
[58] Field of Search....................................260/397.4

[56] References Cited
UNITED STATES PATENTS 3,392,165   7/1968   Edwards et al. .........260/239.55
3,392,166   7/1968   Edwards et al. .........260/239.55

Primary Examiner—Elbert L. Roberts
Attorney—Evelyn K. Merker, Gerard A. Blaufarb and Walter H. Dreger

[57] ABSTRACT

Disclosed is a process for the preparation of a 17α-propadienyl steroids of the estrogen, estrane, and androstane series which contain optional substitution at other positions of the nucleus. This process involves treating a corresponding (3-substituted propynyl) steroid wherein the substituent is halo, alkylsulfonyloxy or aryl sulfonyloxy with a dialkylborane or 9-borabicyclo-[3.3.1]-nonane, followed by base treatment. The 17α-propadienyl products are useful as estrogenic, anti-androgenic, and progestational agents.

13 Claims, No Drawings

PREPARATION OF 17ALPHA PROPADIENYL STEROIDS

This is a continuation-in-part of application, Ser. No. 817,562, filed Apr. 18, 1969.

The present invention relates to a novel process which is useful in the preparation of useful steroidal compounds. Specifically, this invention is directed to a process useful in preparing steroidal 17α-allenes.

Steroid compounds which have a 17α-ethylenically unsaturated side chain, specifically, a 17α-propadienyl (allene) grouping, have been described, for example, in U.S. Pat. Nos. 3,392,165 and 3,392,166. Representative 17α-propadienyl steroids which can be prepared in accordance with the present invention are those of the 6,6-difluoroandrostane and -19-norandrostane, estrogen, estr-5(10)-ene, estr-4-ene and androst-4-ene series as represented by Formulas (I), (II), (III), and (IV), as follows:

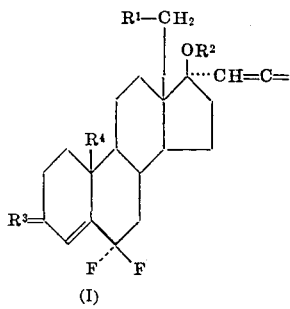

(I)

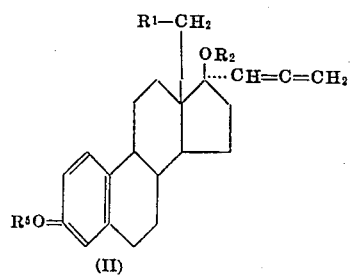

(II)

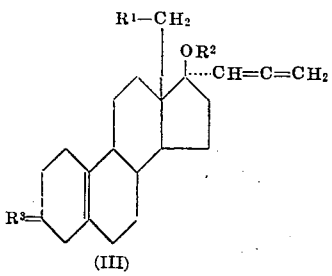

(III)

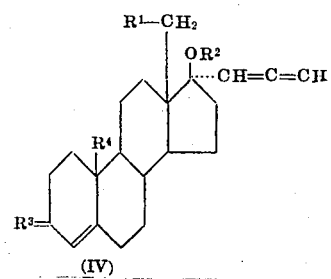

(IV)

In these and succeeding formulas, $R^1$ is hydrogen or lower alkyl of from one to three carbon atoms, inclusive; $R^2$ is hydrogen, tetrahydrofuran-2-yl, tetrahydropyran-2-yl, or a carboxylic acyl group containing less than 12 carbon atoms; $R^3$ is an oxo group or the group

in which $R^6$ is hydrogen, tetrahydrofuran-2-yl, tetrahydropyran-2-yl, or a carboxylic acyl group containing less than 12 carbon atoms; $R^4$ is hydrogen or methyl; and $R^5$ is hydrogen, lower alkyl of from one to eight carbon atoms, inclusive, cycloalkyl, tetrahydrofuran-2-yl, tetrahydropyran-2-yl, or a carboxylic acyl group containing less than 12 carbon atoms.

The 17α-propadienyl derivatives in the estra-1,3,5(10)-triene series (Formula II) possess estrogenic and antiandrogenic activity and are useful in the manner such agents are customarily used for the treatment of conditions responsive to estrogenic and antiandrogenic agents, such as the control and regulation of fertility and the treatment of acne, benign prostrate hypertrophy, and hirsutism in females. The 17α-propadienyl derivatives in the 6,6-difluoroandrostane, 6,6-difluoro-19-norandrostane, estr-5(10)-ene, estr-4-ene, and androst-4-ene series (Formulas I, III and IV) demonstrate progestational and pituitary inhibiting activity and are useful in the manner corresponding to such activity such as in the treatment of various menstrual disorders and in the control and regulation of fertility.

When operating in accordance with preferred embodiments, the present invention is particularly useful for the preparation of the 17α-propadienyl steroids of the estrogen, estrane, and androstane series depicted above in Formulas (I), (II), (III), and (IV).

The novel process of the present invention by which these 17α-propadienyl derivatives are prepared comprises reacting the corresponding 17α-(3-substituted propynyl)steroid wherein the substituent is halo, alkylsulfonyloxy or arylsulfonyloxy together with a dialkylborane or 9-borabicyclo-[3.3.1]-nonane, followed by base treatment.

Suitable dialkylborane reagents for the process of the present invention include those wherein the alkyl group contains from two to eight, and two and three... and eight, and two to three...to eight, carbon atoms, including both straight and branched chain alkyl e.g., ethyl, propyl, butyl, pentyl, isoamyl, hexyl, tetramethylethyl, heptyl, octyl, and the like. Preferred are those wherein both alkyl groups are the same and selected from isoamyl and tetramethylethyl. 9-Borabicyclo-[3.3.1]-nonane is also preferred. Suitable reagents useful in the base treatment include aqueous solutions of alkali metal hydroxides, e.g., aqueous sodium hydroxide and potassium hydroxide.

The borane and base reagents are each employed in at least chemical equivalent amounts with the steroid starting material. Amounts in excess of this, upwards of a 20 to 50 molar excess, can conveniently be employed. Preferred embodiments involve the use of from about 1.5 mole to 20 moles of dialkylborane reagent and base reagent per mole of starting steroid.

The reaction is conducted in the presence of inert, organic liquid reaction medium. Suitable media include the customary organic solvents, for example, ethers, such as dimethyl ether, dioxane, methyl propyl ether, tetrahydrofuran, and the like; saturated aliphatic hydrocarbons, such as pentane, hexane, octane and the like; and aromatic hydrocarbon, such as benzene, toluene, mesitylene, and the like.

The reaction is conducted at temperatures ranging from about −70° C. to about 20° C. and preferably from about −20° C. to about 0° C. The reaction is conducted for a period of time sufficient to complete the reaction ranging from about 20 minutes to about 1 hour or more. Longer or shorter periods may be employed depending upon the choice of reaction temperature and reactants employed.

In a preferred procedure, the dialkylborane reagent is prepared in situ prior to the addition of starting steriod. After the addition of starting steroid and a reaction period of from about 20 minutes to one hour or more, base reagent is added. The base treatment is conducted at temperatures of from about −20° C. to about 0° C. and for a period of time ranging from about 15 minutes to about three hours, preferably about 1 hour. After this time, the respective product is separated and recovered from the reaction mixture via conventional techniques such as filtration, decantation, evaporation, chromatography, recrystallization, and the like.

The dialkylborinate by-product formed in the reaction hereof can be conveniently oxidized and the oxidized product recovered for use in the preparation of dialkylborane reagent. If desired, the optional oxidation can be conducted after the base treatment step either before or after the isolation of propadienyl steroid product.

The dialkylborane reagents are known and can be prepared according to known procedures, as described, for example, by Brown et al., *J. Am. Chem. Soc.* 81, 6428 (1959).

The starting steroid compounds of the present invention which contain a 17α-(3-halopropynyl) grouping are prepared from the corresponding 17α-(3-hydroxypropynyl) compounds. Such conversion is accomplished in the bromo and chloro series by treatment of the hydroxy compound with thionyl bromide or phosphorous pentabromide or with thionyl chloride or phosphorous pentachloride in the presence of a tertiary amine base, such as the tertiary alkyl amines, pyridine, lutidine, and so forth. The reaction is carried out in any convenient order or fashion at temperatures of from about 0° to about 20° C. and, conveniently, in organic liquid reaction medium, such as ether, benzene, and the like.

Alternatively, the bromo and chloro derivatives can be prepared by treating the hydroxy compound with triphenylphosphine and carbon tetrabromide or carbon tetrachloride in organic reaction medium, such as dimethylformamide and dioxane at about 110° C. for a few minutes followed by the usual recovery procedures.

In the fluoro series, the hydroxy compound is treated with a hydrocarbon sulfonyl fluoride including benzyl sulfonyl fluoride, tosyl fluoride and mesyl fluoride. This process also preferably employs an inert hydrocarbon solvent, such as hexane, heptane, benzene, toluene or an esterified or etherified alcohol, such as dimethoxyglycol. Other suitable solvents are chloroform and nitromethane. The reaction is carried out at temperatures of from 0° C. to about 150° C. for from one to about eight hours. Alternatively, the fluoro starting compounds, are prepared by treating the 17α-(3-hydroxypropynyl) compound with a α-fluoroamine, such as those described by Yarovenko et al. in *J.G.C.* (USSR) 29, 1959, in an anhydrous inert organic solvent at steam bath temperatures.

The procedures for preparing the starting 3-halopropynyl steroids hereof are more completely described in, for example, U.S. Pat. No. 3,029,261.

The 17α-(3-arylsulfonyloxypropynyl) and 17α-(3alkylsul-fonyloxypropynyl starting compounds hereof are likewise prepared from the 17α-(3-hydroxypropynyl) compounds upon treatment of the latter with an arlysulfonyl chloride or alkylsulfonyl chloride, respectively. This reaction is conveniently conducted in pyridine and at or about room temperature. Suitable arylsulfonyl chlorides for this purpose include 4-toluenesulfonyl chloride, benzenesulfonyl chloride, 4-bromobenzylsulfonyl chloride, 4-chlorobenzenesulfonyl chloride, 2-nitro-4-chlorobenzenesulfonyl chloride, mesitylenesulfonyl chloride, 4-methoxybenzene sulfonyl chloride, 2-naphthalenesulfonyl chloride 2,4,5-trichlorobenzene sulfonyl chloride, and the like. Suitable alkylsulfonyl chlorides include methanesulfonyl chloride, 3-chloropropanesulfonyl chloride, 1-hexadecanesulfonyl chloride, and the like.

The 17α-(3-hydroxypropynyl) steroid compound from which the 3-(substituted propynyl) derivatives are prepared are, in turn, prepared via several methods. In one such method, a Grignard reagent is prepared upon treatment of the product of the reaction of propargyl alcohol and dihydropyran, 3-(tetrahydropyran-2'-yloxypropyne) with magnesium and ethyl bromide in the method known per se. This reagent is then reacted with a 17-oxo steroid. In this manner, the corresponding 17α-(3'-tetrahydropyran-2'-yloxypropynyl) steroidal derivative is prepared. Thereafter, the thus formed derivative is conventionally hydrolyzed, such as with a mineral or organic acid, to hydrolyze the tetrahydropyran-2'-yloxy group forming the hydroxyl.

In another method for the preparation of the 3-hydroxypropynyl compounds hereof, which method is particularly useful in the estrogen series, a 17-oxo starting compound is ethynylated via the method known per se, that is, through treatment with potassium acetylide to give the 17α-ethynyl-17β-hydroxy derivative. Thereafter, the 17β-hydroxy group is preferably protected before further reaction, such as by forming the tetrahydropyran-2'-yloxy or tetrahydrofuran-2'-yloxy ether thereof. In such further reaction, the ethynyl group is elaborated as respect the addition of the hydroxymethyl group as a replacement for the acidic hydrogen. This is accomplished by forming the ethynyl lithium salt (by treating the ethynyl derivative at room temperature with an equivalent amount of an ether solution of methyl, butyl or phenyl lithium) and treating this with an equivalent or slight excess amount of paraformaldehyde at gentle reflux in ether followed by hydrolysis, all in accordance with the procedures described by Schaap et (al. in *Rec. Trav. Chim.* 84, 1200 (1965) as well as the references cited therein.

In the preparation of the starting 17α-(3-substituted propynyl) derivatives in the 6,6-difluoroandrostane and -19-nor-androstane series, the forgoing preparations can be practiced upon the corresponding 6,6-difluoroandrost-4-ene-3,17-diones and 6,6-difluoro-19-norandrost-4-ene-3,17-diones and the 18-alkyl derivatives thereof. In practice, the 6,6-difluoro grouping is introduced into the precursor androst-4-ene-3,17-diones and 19-norandrost-4-ene-3,17-diones or 18-alkyl derivatives thereof. One method by which this is done is described in U.S. Pat. No. 3,219,673. This method involves treating a 3-acyloxy-5-fluoro-6-keto steroid (which are known or can be prepared as described in the cited patent and its references) with sulfur tetrafluoride to prepare the corresponding 3-acyloxy-5,6,6-trifluoro steroid which is hydrolyzed to the 3-hydroxy-5,6,6-trifluoro compound. The latter compound is oxidized to the corresponding 3-keto-5,6,6-trifluoro derivative which is then treated with a dehydrofluorinating agent such as alumina to provide the 3-keto-$\Delta^4$-6,6-difluoro compound.

Another method by which these 6,6-difluoro precursor steroids are prepared involves twice consecutively forming an enol ether and treating this with perchloryl fluoride. Thus, the starting androst-4-ene-3,17-dione is converted to its enol ether and it is treated with perchloryl fluoride to form the 3-keto-$\Delta^4$-6-fluoro derivative. The same procedure is followed with this compound to form the 3-keto-$\Delta^4$-6,6-difluoro products. The enol ether formation and fluorination treatment are each conventional reactions in the steroid art.

In the preferred embodiments, the desired non-interfering elaborative groupings at the other optional sites of the molecule are introduced prior to the novel, principal reaction hereof. Protection is preferably provided for those groups which may compete or interfere with the principal reaction hereof or with the processes preparative to the principal reaction hereof. Examples of such protection include forming the dialkoxy, ketal or enol ethers of the 3-oxo function which can be restored later in the synthetic sequence. The reaction is preferably conducted upon a starting compound bearing a 17$\beta$-hydroxy, 17$\beta$-carboxylic acyloxy, or 17$\beta$-conventional ether, e.g., tetrahydropyran-2-yloxy. An ester group if present, is hydrolyzed during the base treatment but it can be conventionally restored. The 17$\beta$-substituted compound is protected at C-3 as described above and the 17$\alpha$-(3-substituted propynyl) compounds thereof then prepared from the 17$\alpha$-(3-hydroxypropynyl) compounds thus substituted at C-17$\beta$ and protected at C-3.

In the estrogen series, treatment of, for example, the 17$\alpha$-ethynyl-3,17$\beta$-diol derivative with an appropriate carboxylic acid anhydride, such as acetic anhydride, in pyridine yields the 3-acyloxy-17$\beta$-hydroxy derivative selectively. Use of an acid anhydride in the presence of the corresponding acid and an acid catalyst, such as p-toluenesulfonic acid yields the 3,17$\beta$-diacyloxy derivative. This diester may then be selectively saponified as through the use of methanolic potassium bicarbonate to yield the corresponding 3-hydroxy-17$\beta$-acyloxy derivative. Similarly, etherification may be performed via the conventional procedures. Thus, treatment with dihydropyran in the presence of an acid catalyst such as p-toluenesulfonic acid, p-toluenesulfonyl chloride, dinitrobenzenesulfonic acid, or the like, yields the corresponding tetrahydropyran-2-yloxy derivative. Formation of the mono-tetrahydropyranyl ether may be accomplished by selective protection of other hydroxy groups as through ester formation, in the manner described above, with alkaline hydrolysis of such ester groups after formation of the ether, if desired. Formation of 3-methoxy derivatives may likewise be realized through the use of dimethylsulfate and potassium hydroxide in the conventional manner.

Similar conventional esterification and etherification procedures can be employed in the other series of starting compounds for the present invention. For example, in the preparation of the 3$\beta$,17$\beta$-diacylate starting materials for the process hereof, the 3,17-dioxo compound can be reduced and acylated with about one chemical equivalent of acylating agent. The product mixture is then chromatographed to separate the 3$\beta$-acylate-17$\beta$-ol compound. This derivative is then oxidized to the 3$\beta$-acylate-17-oxo compound. The Grignard method of introducing the hydroxypropynyl group at C-17$\beta$, as described above, is then followed including the addition of the appropriate acylating agent before workup to form the 3$\beta$,17$\beta$-diacylate-17$\alpha$-tetrahydropyranyloxypropynyl compound. This compound is then converted to the corresponding 17$\alpha$-(3-substituted propynyl) derivative.

The 3$\beta$,17$\beta$-diethers can be conveniently formed by initially preparing the 3$\beta$,17$\beta$-diethers and then following this with the formaldehyde method of preparing the 17$\alpha$-(hydroxypropynyl) compounds, as described above.

If a mixed ester-ether compound is desired, the mono-ether is prepared in a sequence similar to that used for preparing the mono-acylate. Thereafter, the described Grignard method is followed ending with an acylation before work-up. Alternatively, the mono-acylate, prepared as described above, can be ethynylated at C-17$\alpha$ and the C-17$\beta$ hydroxyl etherified. Thereafter, the described formaldehyde method is employed for the preparation of the corresponding 17$\alpha$-(hydroxypropynyl) compound.

In the present specification and claims, the term "carboxylic acyl group" and "carboxylic acyloxy group" denote acyl and acyloxy groups which contain less than 12 carbon atoms and which can be of a straight, branched, or cyclic chain structure. This structure can further be saturated, unsaturated or aromatic and optionally substituted by functional groups such as hydroxy, alkoxy containing up to five carbon atoms, acyloxy containing up to 12 carbon atoms, nitro, amino, halogeno, and the like. Representative esters thus include acetate, propionate, enanthate, benzoate, trimethylacetate, t-butylacetate, phenoxyacetate, cyclopentylpropionate, aminoacetate, $\beta$-chloropropionate, adamantoate, bicyclo[2.2.2] octane-1-carboxylate, bicyclo[2.2.2]oct-2-ene-1-carboxylate, 4-methylbicyclo[2.2.2]oct-2-ene-1-carboxylate, and so forth. The "lower alkyl" group in the present specification and claims can be of straight or branched chain structure. Representative lower alkyl groups include methyl, ethyl, isopropyl, n-butyl, t-butyl, n-hexyl, n-heptyl, n-octyl, isoctyl, and the like. In the present specification and claims, the term "cycloalkyl group" which is represented above by $R^5$ include, for example, cyclopentyl, cyclohexyl, and the like, and in general, contain from three to eight carbon atoms. In the present specification and claims, the term "3-halopropynyl" includes 3-bromopropynyl, 3-chloropropynyl, and 3-fluoropropynyl, preferably 3-chloropropynyl.

The "alkylsulfonyloxy" grouping hereof is one wherein the alkyl group is as defined above, preferably containing from one to six carbon atoms; inclusive. The alkyl group can also be substituted, notably with halogen. The arylsulfonyloxy grouping hereof is one wherein the aryl group is naphthyl, phenyl or a mono or poly substituted phenyl, the substituents being selected from alkyl, alkoxy, halogeno, nitro, and the like.

The following preparations and examples serve to further illustrate the manner by which the present invention can be practiced. As such, however, they should not be construed as limitations upon the overall scope hereof.

PREPARATION 1

A solution is prepared by dispersing 29 grams of estr-4-ene-3,17-dione in 600 ml. of dioxane at room temperature with stirring. Ethyl orthoformate (60 ml) and 1.8 grams of p-toluenesulfonic acid hydrate are added to the resultant mixture. The addition is conducted portionwise, with stirring, and at room temperature. After the addition is complete, the resulting reaction mixture is allowed to stand at room temperature for 3 ½ hours. After this time, the resulting solution is poured into two liters of ice water. After this has been accomplished, the whole mixture is filtered to yield a crystalline material which is recrystallized from methylene chloride:methanol containing a few drops of pyridine to obtain the desired 3-ethoxyestra-3,5-dien-17-one product.

Propargyl alcohol (42 grams) is dispersed in 63 grams of 2,3-dihydropyran with stirring. While continuing the stirring at room temperature, phosphorus oxychloride (500 mg) is added portionwise to the resultant solution. The reaction mixture rapidly becomes warm and is cooled intermitently in ice. After maintaining these conditions for 2 hours and then allowing the temperature of the reaction mixture to stabilize at room temperature, an aqueous solution of potassium hydroxide is added. The mixture is then extracted with ether and the ether extracts distilled under gradually increasing temperatures and gradually decreasing pressures to obtain the 3-tetrahydropyran-2'-yloxypropyne product.

Under anhydrous conditions, 3.2 g. of magnesium, 11 ml. of ethyl bromide, and 150 ml. of absolute ether are mixed together at room temperature. To the resulting solution is added, dropwise and at room temperature, 30 g. of the 3-tetrahydropyran-2'-yloxypropyne product obtained as described above. The temperature of the resulting mixture is heated to the boiling point and maintained under reflux conditions for 5 minutes. After this time, the mixture is cooled to room temperature and mixed dropwise with a solution containing 21 grams of 3-ethoxyestra-3,5-dien-17-one which is dispersed in 200 ml. of tetrahydrofuran. After this addition is complete, the reaction mixture is stirred at room temperature for a period of two hours. The resulting solution is cooled in an ice-bath and then mixed with 70 ml. of acetic anhydride. This solution is then left at room temperature for 16 hours. After this, the mixture is poured into an ammonium chloride:ice solution and this is then extracted with ether, the ether extracts being dried and evaporated to a concentrated form. The concentrate is chromatographed to obtain a crystalline produce which is crystallized from ethyl acetate:hexane:petroleum ether. Recrystallization from the same solvent mixtures obtains the desired 3-ethoxy-17α-(3-tetrahydropyran-2'-yloxypropynyl)-17β-acetoxyestra-3,5-diene product.

3-Ethoxy-17α-(3-tetrahydropyran-2'-yloxypropynyl)-17β-acetoxyestra-3,5-diene (18 g.) is dissolved in 750 ml. of methanol at room temperature. Thereafter, 20 g. of oxalic acid is dispersed in 150 ml. of water and the resultant aqueous oxalic acid solution is added to the steroid methanol solution at room temperature in a portionwise fashion. The resulting reaction mixture is left overnight at room temperature. The reaction mixture is then neutralized by the portionwise addition of sodium hydroxide and the neutralized mixture is filtered. The filtrate is concentrated in vacuum to a residue. The residue is extracted with an ether:methylene chloride mixture to provide a solution which is then dried over sodium sulfate. The dried solution is evaporated to obtain a solid. The solid is chromatographed on a column of silica gel eluting with hexane:ethyl acetate to obtain a substance which is recrystallized from ethyl acetate:hexane to obtain the 17α-(3-hydroxypropynyl)-17β-acetoxyestr-4-en-3-one product as a crystalline solid.

A mixture of 20 ml. of absolute pyridine, 8 ml. of freshly distilled thionyl chloride, and 90 ml. of absolute tetrahydrofuran is prepared at room temperature with stirring. 17α-(3-Hydroxypropynyl)-17β-acetoxyestr-4-en-3-one (3.4 g.) which is dissolved in 50 ml. of anhydrous tetrahydrofuran are added to the resulting solution over a 25 minute period at room temperature. After the addition is complete, the reaction mixture is stirred at room temperature for 35 minutes. After this period of time, the mixture is poured into ice water and the resulting mixture is extracted with ether:methylene chloride. The extracts are washed with water and dried over sodium sulfate. The dried material is evaporated to an oil. The oil is chromatographed on silica gel to obtain the desired 17α-(3-chloropropynyl)-17β-acetoxyestr-4-en-3-one product.

In like manner, the foregoing procedures can be practiced on the corresponding 18-alkyl compounds thus providing as final compounds, 17α-(3-chloropropynyl)-17β-acetoxy-18-methylestr-4-en-3-one 17β-(3-chloropropynyl)-17β-acetoxy-18-ethylestr-4-en-3-one; 17α-(3-chloropropynyl)-17β-acetoxy-18-n-propylestr-4-en-3-one.

PREPARATION 2

To a slurry of 1.0 g. of sodium hydride in 10 ml. of fry diethyleneglycol dimethyl ether under a dry nitrogen atmosphere is slowly added 1.0 g. of 3-methoxy-17α-ethynylestra-1,3,5(10)-trien-17β-ol in 10 ml. of dry diethyleneglycol dimethyl ether in a dropwise fashion over a 20 minute period. To this mixture is added dropwise, 0.9 g. of 2-chlorotetra-hydropyran over a 10 minute period. The mixture is stirred at room temperature for an additional 30 minutes and then cautiously added to an ice-water mixture with stirring. The organic phase is extracted with diethyl ether, dried and evaporated under reduced pressure to yield 3-methoxy-17α-ethynyl-17β-tetrahydropyran-2'-yloxyestr-1,3,5(10)-triene which may be further purified via recrystallization from acetone:hexane.

A solution of 2.5 grams of phenyllithium in 25 ml. of diethyl ether is prepared. While maintaining this solution at room temperature, 10 grams of 3-methoxy-17α-ethynyl-17β-tetra-hydropyran-2'-yloxyestr-1,3,5(10)-triene are added thereto to provide a solution containing 3-methoxy-17α-ethynyllithium-17β-tetrahydropyran-2'-yloxyestr-1,3,5(10)-triene. To the resulting solution is added, portionwise and with stirring, 4 grams of paraformaldehyde. The addition is conducted at a rate to maintain gentle reflux of the solution. After the addition, the mixture is stirred for 20 hours, and then poured into water and extracted with ether. The ether extracts are washed with water, dried and evaporated to obtain the 3-methoxy-17α-(3-hydroxypropynyl)-17β-tetrahydropyran-2'-yloxyestr-1,3,5(10)-triene product.

3-Methoxy-17α-(3-hydroxypropynyl)-17β-tetrahydropyran-2'-yloxyestra-1,3,5,(10)-triene (1 g.) is dispersed in 50 ml. of anhydrous ether at room temperature with stirring. To the resultant solution is added 1.5 ml. of purified thionyl chloride. The addition is conducted portionwise at 0° C. The resulting reaction mixture is then allowed to stand at 0° C. for a period of 6 minutes after which time it is washed with aqueous sodium bicarbonate solution followed by water. The washed material is then dried over sodium sulfate and evaporated to dryness to obtain the 3-methoxy-17α-(3-chloropropynyl)-17β-tetrahydropyran-2'-yloxyestra-1,3,5(10)-triene product which is recrystallized from ether:ethyl acetate.

To a solution of 1 g. of 3-methoxy-17α-(3-chloropropynyl)-17β-tetrahydropyran-2'-yloxyestra-1,3,5(10)-triene in 30 ml. of dioxane is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate, and evaporated to dryness to yield 3-methoxy-17α-(3-chloropropynyl)-estra-1,3,5(10)-triene-17β-ol which is recrystallized from acetone:hexane.

PREPARATION 3

17α-(3-Hydroxypropynyl)-estr-4-en-17β-ol-3-one (1.5 g.) is dissolved into 75 ml. of toluene. The resulting solution is mixed with 2 g. of benzene sulfonyl fluoride. The reaction mixture is then heated to a temperature ranging from 80° to 90° C. and for a period of 4 hours. At the end of this reaction period, the mixture is cooled and then poured into ice water. The organic layer is then washed with a sodium bicarbonate solution and then with water, and, following the washings, is dried over sodium sulfate. Solvent is then removed by evaporation and the remaining residue is recrystallized from ether to obtain the 17α-(3-fluoropropynyl)-estr-4-en-17β-ol-3-one product.

PREPARATION 4

Five grams of 17α-(3-Hydroxypropynyl)-estr-4-en-17β-ol-3-one are added portionwise to a mixture of 6 g. of triphenylphosphine, 2 ml. of carbon tetrachloride, and 50 ml. of dimethylformamide at room temperature and with stirring. The resulting mixture is then heated at 110° C. and maintained thereat for 15 minutes. The mixture is then poured into ice water and the aqueous mixture is then extracted with methylene chloride:ether. The extracts are dried and evaporated to obtain the 17α-(3-chloropropynyl)-estr-4-en-17β-ol-3-one product.

PREPARATION 5

17α-(3-Bromopropynyl)-androst-4-en-17β-ol-3-one is prepared in accordance with the procedures of Preparation 1, 2 and 4 by substituting thionyl bromide for thionyl chloride in Preparations 1 and 2 and by substituting carbon tetrabromide for carbon tetrachloride in Preparation 4. Likewise, by employing the appropriate starting compounds, the corresponding 18-methyl, -ethyl, and -propyl derivatives are prepared. Similarly, these procedures are applicable in the preparation of the 17α-(bromopropynyl) derivatives in the estrogen and estrane series.

PREPARATION 6

A mixture of 1 g. of 17α-(3-hydroxypropynyl)-17β-acetoxyestr-4-en-3-one in 5 ml. of pyridine and 0.5 g. of methanesulfonyl chloride is allowed to stand at room temperature for 24 hours and is then diluted with water and filtered. The solid thus collected is dried and recrystallized from acetone:hexane to yield 17α-(3-methylsulfonyloxypropynyl)-17β-acetoxyestr-4-en-3-one.

Similarly, 17α-(3-p-tolylsulfonyloxypropynyl)-17β-acetoxyestr-4-en-3-one is prepared by substituting p-toluenesulfonyl chloride for methanesulfonyl chloride in the foregoing procedure. Likewise, the corresponding 17α-(3-methylsulfonyloxypropynyl) and 17α-(3-p-tolylsulfonyloxypropynyl) derivatives of the other 17α-(3-hydroxypropynyl) starting compounds of the present invention are prepared.

Also prepared are the corresponding 17α-(3-ethanesulfonyloxypropynyl), -(3-propanesulfonyloxypropynyl), -(3-benzenesulfonyloxy), and -(3-mesitylenesulfonyloxy) derivatives.

PREPARATION 7

To a suspension of 1 g. of estr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxyestra-3,5-dien-17-one which is recrystallized from acetone:hexane.

A stream of perchloryl fluoride is passed through a solution of 1 g. of 3-ethoxyestra-3,5-dien-17-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to yield a mixture of the 6α-fluoro and 6β-fluoro isomers. To the mixture in 7.5 ml. of anhydrous, peroxide-free dioxane is added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-methoxy-6-fluoroestra-3,5-dien-17-one which is recrystallized from acetone:hexane.

A stream of perchloryl fluoride is passed through a solution of 1 g. of 3-ethoxy-6-fluoroestra-3,5-dien-17-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to provide 6,6-difluoroestr-4-ene-3,17-dione produce on recrystallization from acetone:hexane.

In like manner, 6,6-difluoroandrost-4-ene-3,17-dione, 6,6-difluoro-18-methylestr-4-ene-3,17-dione, 6,6-difluoro-18-methylandrost-4-ene-3,17-dione, 6,6-difluoro-18-ethylestr-4-ene-3,17-dione, 6,6-difluoro-18-ethylandrost-4-ene-3,17-dione, 6,6-difluoro-18-propylestr-4-ene-3,17-dione and 6,6-difluoro-18-propylandrost-4-ene-3,17-dione are prepared from the respective starting compound.

PREPARATION 8

A solution of 1 g. of sodium borohydride in 3ml. of water is added to an ice-cooled solution of 1 g. of 6,6-difluoroestr-4-ene-3,17-dione in 120 ml. of methanol and the mixture is then allowed to stand for 16 hours at room temperature. The excess reagent is decomposed by the addition of acetic acid and the solution is then concentrated to a small volume in vacuo and diluted with water. The product is extracted with ethyl acetate and these extracts are washed with water, dried and evaporated to yield 6,6-difluoroestr-4-ene-3$\beta$,17$\beta$-diol which may be further purified by recrystallization from acetone: hexane.

A mixture of 3g. of 6,6-difluoroestr-4-ene-3$\beta$,17$\beta$-diol, 10 ml. of pyridine and 0.9 ml. of acetic anhydride is allowed to stand at room temperature for 15 hours. The mixture is then poured into ice water and the solid which forms is collected by filtration, washed with water and dried to yield 3$\beta$,17$\beta$-diacetoxy-6,6-difluoroestr-4-ene, 3$\beta$-acetoxy-6,6-difluoroestr-4-en-17$\beta$-ol and 6,6-difluoro-17$\beta$-acetoxyestr-4-en-3$\beta$-ol which are separated by chromatography.

A solution of 6 g. of 3$\beta$-acetoxy-6,6-difluoroestr-4-en-17$\beta$-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3$\beta$-acetoxy-6,6-difluoroestr-4-en-17-one which may be further purified by recrystallization from acetone: hexane.

The thus prepared derivative is treated in accordance with the procedures set forth in Preparation 1, paragraphs 3 and 4, to prepare the 3$\beta$,17$\beta$-diacetoxy-6,6-difluoro -17$\alpha$-(3-hydroxypropynyl)-estr-4-ene which is converted to the corresponding 17$\alpha$-(3-halopropynyl) derivatives via the procedures set forth in Preparations 1 (paragraph 5), 3 and 5 or to the 17$\alpha$-(3-methylsulfonyloxypropynyl) and 17$\alpha$-(3p-toluenesulfonyloxypropynyl) derivatives via the procedures set forth in Preparation 6. Also thus prepared is 3$\beta$, 17$\beta$-diacetoxy-6,6-difluoro-17$\alpha$-(3-halopropynyl) and 3$\beta$,17$\beta$-diacetoxy-6,6-difluoro-17$\beta$-(3-methylsulfonyloxpropynl)-androst-4-ene and 3$\beta$,17$\beta$-diacetoxy-6,6-difluoro-17$\alpha$-(3-p-tolylsulfonyloxypropynyl)-androst-4-ene.

Substitution of an alternate carboxylic acid anhydride in the above procedures affords the corresponding diacylates, for example, the propionates, benzoates, pentanoates, and adamantoates, for example, 3$\beta$, 17$\beta$-dipropionyloxy-6,6-difluoro-17$\alpha$-(3-halopropynyl)-19-norandrost-4ene, 3$\beta$,17$\beta$-diacetoxy-6,6-difluoro-17$\alpha$-(3-methylsulfonyloxypropynyl)-18-ethylestr-4-ene, 3$\beta$,17$\beta$-dipropionyloxy-6,6-difluoro-17$\alpha$-(3-p-tolylsulfonyloxypropynyl)-androst-4-ene, 3$\beta$,17$\beta$-dibenzoyloxy-17$\alpha$-(3-halopropynyl)-estr-4-ene, 3$\beta$,17$\beta$-dibenzoyloxy-17$\alpha$-(3-benzenesulfonyloxypropynyl)-18-methylandrost-4-ene, and 3$\beta$,17$\beta$-diadamantoyloxy-17$\alpha$-(3-halopropynyl)-18-methylestr-5(10)-ene, and so forth.

PREPARATION 9

A solution of 2 g. of 6,6-difluoroestr-4-ene-3,17-dione in 20 ml. of anhydrous tetrahydrofuran is cooled to −75° C. in a dry ice-acetone bath and treated with a previously cooled solution of 0.6 g. of lithium aluminum t-butoxide in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 6,6-difluoroestr-4-ene-3$\beta$,17$\beta$-diol.

To a slurry of 1.0 g. of sodium hydride in 10 ml. of dry diethyleneglycol dimethyl ether under a dry nitrogen atmosphere is slowly added 1.0 g. of 6,6-difluoroestr-4-ene-3$\beta$,17$\beta$-diol in 10 ml. of dry diethyleneglycol dimethyl ether in a dropwise fashion over a 20 minute period. To this mixture is added dropwise 0.9 g. of 2-chlorotetrahydropyran over a 10 minute period. The mixture is then stirred at room temperature for an additional 30 minutes and then cautiously added to an ice-water mixture with stirring. The organic phase is extracted with diethyl ether, dried and evaporated under reduced pressure to yield 3$\beta$,17$\beta$-bis(tetrahydropyran-2'-yloxy)-6,6-difluoroestr-4-ene, 3$\beta$-tetrahydropyran-2'-yloxy-6,6-difluoroestr-4-en-17$\beta$-ol and 6,6-difluoro-17$\beta$-tetrahydropyran-2'-yloxyestr-4-en-3$\beta$-ol which are separated by chromatography on alumina.

Substitution of dihydrofuran in the above procedure prepares the corresponding tetrahydrofuran-2'-yloxy derivatives.

A solution of 6 g. of 3$\beta$-tetrahydropyran-2'-yloxy-6,6-difluoroestr-4-en-17$\beta$-ol in 120 ml. of pyridine is added to a mixture of 5 g. of chromic trioxide in 20 ml.

of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-tetrahydropyran-2'-yloxy-6,6-difluoroestr-4-en-17β-one which may be further purified by recrystallization from acetone:hexane.

To a solution of 1 gram of lithium aluminum hydride in 100 ml. of anhydrous tetrahydrofuran is continuously bubbled a slow current of purified acetylene for 1 hour. Thereafter, 1 gram of 3β-tetrahydropyran-2'-yloxy-6,6-difluoroestr-4-en-17-one in 10 ml. of tetrahydrofuran is added and the reaction mixture stirred at room temperature for four hours. Eight milliliters of water is then added and the mixture is stirred for 30 minutes. The mixture is then filtered and the organic filtrate evaporated to yield 3β-tetrahydropyran-2'-yloxy-6,6-difluoro-17α-ethynylestr-4-17β-ol which is recrystallized from acetone:hexane.

In a similar manner, 3β-tetrahydrofuran-2'-yloxy-6,6-difluoro-17β-ethynylestr-4-en-17β-01 is prepared.

The thus prepared 3β-tetrahydropyran-2'-yloxy-6,6-difluoro-17α-ethynylestr-4-en-17β-ol and 3β-tetrahydrofuran-2'-yloxy-6,6-difluoro-17α-ethynylestr-4-en-17β-ol compounds are then treated in accordance with the procedure of Preparation 2 (paragraph 2) followed by procedures set forth in Preparations 2, 3, 4, 5, or 6 to respectively form 3β-tetrahydropyran-2'-yloxy-6,6-difluoro-17α-(3-halopropynyl)-estr-4-en-17β-ol and 3β-tetrahydrofuran-2'-yloxy-6,6-difluoro-17α-(3-halopropynyl)-estr-4-en-17β-ol and 3β-tetrahydrofuran-2'-yloxy-6,6-difluoro-17α-(3-methylsulfonyloxypropynyl)-estr-4-en-17β-ol and 3β-tetrahydropyran-2'-yloxy-6,6-difluoro-17α-(3 -p-tolylsulfonyloxypropynyl)-4-en-17β-ol and 3β-tetrahydrofuran-2'-yloxy-6,6-difluoro-17α-(3-methylsulfonyloxypropynyl)-estr-4-en-17β-ol and 3β-tetrahydrofuran-2'-yloxy-6,6-difluoro-17α-(3-p-tolylsulfonyloxypropynyl)-estr-4-en-17β-ol.

The thus prepared 3β-monoethers can then be acylated as described in Preparation 8 above to prepare the mixed ester-ether derivatives. Thus formed, for example, are 3β-tetrahydropyran-2'-yloxy-6,6-difluoro-17α-(3-halopropynl)-17β-acetoxyestr-4-ene, 3β-tetrahydrofuran-2'-yloxy-6,6-difluoro-17α-(3-halopropynyl)-17β-acetoxyestr-4-ene, 3β-tetrahydropyran-2'-yloxy-6,6-difluoro-17α-(3-halopropynyl)-17β-acetoxyandrost-4-ene, 3β-tetrahydrofuran-2'-yloxy-6,6-difluoro-17α-(3-halopropynyl)-17β-acetoxyandrost-4-ene, 3β-tetrahydropyran-2'-yloxy-6,6-difluoro-17α-(3-halopropynyl)-17β-propionyloxyestr-4-ene, 3β-tetrahydrofuran-2'-yloxy-6,6-difluoro-17α-(3-halopropynyl)-17β-propionyloxyestr-4-ene, 3β-tetrahydropyran-2'-yloxy-6,6-dilfuoro-17α-(3-halopropynyl)-17β-propionyloxyandrost-4-ene, 3β-tetrahydrofuran-2'-yloxy-6,6-difluoro-17α-(3-halopropynyl)-17β-propionyloxyandrost-4-ene, 3β-tetrahydrofuran-2'-yloxy-6,6-difluoro-17α-(3-halopropynyl)-17 β-caproyloxyestr-4-ene, 3β-tetrahydrofuran-2'-yloxy-6,6-difluoro-17α-(3-halopropynyl)-17β-caproyloxyestr-4-ene, 3β-tetrahydropyran-2'-yloxy-6,6-difluoro-17α-(3-halopropynyl)-17β-caproyloxyandrost-4-ene, 3β-tetrahydrofuran-2'-yloxy-6,6-difluoro-17α-(3-halopropynyl)-17β-caproyloxyandrost-4-ene, as well as the corresponding 17α-(3-methylsulfonyloxypropynyl) and 17α-(3-p-tolylsulfonyloxypropynyl) derivatives thereof.

PREPARATION 10

The compound 3β-acetoxy-6,6-difluoroestr-4-ene-17-one is treated in accordance with the procedure set forth in paragraph 5 of Preparation 9 to prepare 3β-acetoxy-6,6-difluoro-17α-ethynylestr-4-en-17β-ol.

This derivative is then etherified in accordance with procedure set forth in paragraphs 2 or 3 of Preparation 9 to respectively prepare the corresponding 3β-acetoxy-6,6-difluoro-17α-ethynyl-17β-tetrahydropyran-2'-yloxyestr-4-ene and 3β-acetoxy-6,6-difluoro-17α-ethynyl-17β-tetrahydrofuran-2'-yloxyestr-4-ene.

In like manner, the foregoing procedures can be followed with the other starting 3β-acylates described in the foregoing procedures.

PREPARATION 11

To a suspension of 1 g. of estr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxyestra-3,5-dien-17-one which is recrystallized from acetone:hexane.

A solution of 1 g. of 3-ethoxyestra-3,5-dien-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3-ethoxy-17α-ethynylestra-3,5-dien-17β-ol which is recrystallized from acetone:hexane.

To a slurry of 1.0 g. of sodium hydride in 10 ml. of dry diethyleneglycol dimethyl ether under a dry nitrogen atmosphere is slowly added 1.0 g. of 3-ethoxy-17α-ethynylestra-3,5-dien-17β-ol in 10 ml. of dry diethyleneglycol dimethyl ether in a dropwise fashion over a 20 minute period. To this mixture is added dropwise, 0.9 g. of 2-chlorotetrahydropyran over a 10 minute period.

The mixture is stirred at room temperature for an additional 30 minutes and then cautiously added to an ice-water mixture with stirring. The organic phase is extracted with diethyl ether, dried and evaporated under reduced pressure to yield 3-ethoxy-17α-ethynyl-17β-tetrahydropyran-2'-yloxyestra-3,5-diene which may be further purified via recrystallization from acetone:hexane.

A solution of 2.5 grams of phenyllithium in 25 ml. of diethyl ether is prepared. While maintaining this solution at room temperature, 10 grams of 3-ethoxy-17α-ethynyl-17β-tetrahydropyran-2'-yloxyestra-3,5-diene are added thereto to provide a solution containing 3-ethoxy-17α-ethynyllithium-17β-tetrahydropyran-2'-yloxyestra-3,5-diene. To the resulting solution is added, portionwise and with stirring, 4 grams of paraformaldehyde. The addition is conducted at a rate to maintain gentle reflux of the solution. After the addition, the mixture is stirred for 20 hours, and then poured into water and extracted with ether. The ether extracts are washed with water, dried and evaporated to obtain the 3-ethoxy-17α-(3-hydroxypropynyl)-17β-tetrahydropyran-2'-yloxyestra-3,5-diene.

If desired, the 17β-tetrahydropyran-2-yloxy group can be conventionally hydrolyzed.

A solution of 1 g. of 3-ethoxy-17α-(3-hydroxypropynyl)-17β-tetrahydropyran-2'-yloxyestra-3,5-diene in 40 cc. of anhydrous ether is treated with 1 molar equivalent of 2-chloro-1,1,2-trifluorotriethylamine and the mixture heated on the steam bath for 20 minutes. The reaction mixture is then evaporated to dryness and the residue chromatographed on Florisil, to produce 3-ethoxy-17α-(3-fluoropropynyl)-17β-tetrahydropyran-2'-yloxyestra-3,5-diene.

By use of the procedure of Preparation 4 in lieu of the above procedure, 3-ethoxy-17α-(3-chloropropynyl)-17β-tetrahydropyran-2'-yloxyestra-3,5-diene is prepared. Similarly, 3,3-ethylenedioxy-17α-(3-fluoropropynyl)-17β-tetrahydropyran-2'-yloxyestr-5-ene and 3,3-ethylenedioxy-17α-(3-chloropropynyl)-17β-tetrahydropyran-2'-yloxyestr-5-ene are prepared by substituting the 3-ketal formation step as the protective step.

EXAMPLE 1

A mixture of 5 g. of 17α-(3-chloropropynyl)-estr-4-en-17β-ol-3-one, 25 ml. of dry benzene, 25 ml. of ethylene glycol and 250 mg. of p-toluenesulfonic acid monohydrate is refluxed for 16 hours using a water separator. The reaction mixture is then washed with aqueous sodium bicarbonate solution and water, dried and evaporated to dryness to yield 3,3-ethylenedioxy-17α-(3-chloropropynyl)-estr-5-en-17β-ol which is recrystallized from acetone:hexane.

To a solution of 2-methyl-2-butene (0.02 mole) in 10 ml. of tetrahydrofuran is added 50 ml. of a solution of borane (10 mmol.) in tetrahydrofuran while maintaining the temperature between −10° C. and 0° C. The reaction mixture is stirred at 0°–5° C. for 2 hours. To the diisoamylborane (10 mmole) formed are added, at −20° to −10° C., 10 ml. of a solution of 3,3-ethylenedioxy-17α-(3-chloropropynyl)-estr-5-en-17β-ol ( 5 mmole) in tetrahydrofuran. The reaction mixture is stirred at 0°–5° C. for 30 minutes. To the resulting reaction mixture is added, at −20° to −10° C., 30 ml. of 6N sodium hydroxide and the mixture is then stirred vigorously at 0°–5° C. for 30 minutes. Then 18 ml. of 30 percent hydrogen peroxide are added at 25°–35° C. The reaction mixture is repeatedly extracted with n-pentane and the extracts dried and evaporated to give 3,3-ethylenedioxy-17α-propadienylestr-5-en-17β-ol.

A mixture of 0.5 g. of 3,3-ethylenedioxy-17α-propadienylestr-5-en-17β-ol in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 17α-propadienylestr-4-en-17β-ol-3-one which is recrystallized from acetone:hexane.

The procedure of the above example relating to the preparation of diamylborane is repeated with appropriate starting materials, to prepare diethylborane, di-n-propylborane, di-n-butylborane.

EXAMPLE 2

Diethylborane is prepared from borane and ethylene as described in Example 1. To the diethylborane (1 mmole) in tetrahydrofuran are added, at 0° C., 10 ml. of a solution of 3-ethoxy-17α-(3-chloropropynyl)-17β-tetrahydropyran-2'-yloxyestra-3,5-diene (1 mmole) in tetrahydrofuran. The reaction mixture is stirred at 0° C. for 30 minutes. After this time, 30 ml. of aqueous potassium hydroxide solution are added and the mixture is then stirred at 0° C. for 30 minutes. The reaction mixture is repeatedly extracted with ethyl acetate and the extracts dried and evaporated to give 3-ethoxy-17α-propadienyl-17β-tetrahydropyran-2'-yloxyestra-3,5-diene.

To a solution of 1 g. of 3-ethoxy-17α-propadienyl-17β-tetrahydropyran-2'-yloxyestra-3,5-diene in 10 ml. of acetone are added a few drops of 36 percent hydrochloric acid. The mixture is heated a few minutes at steam bath temperatures, diluted with water and filtered. The solid thus collected is dried and recrystallized from acetone:hexane to yield 17α-propadienylestr-4-en-17β-ol-3-one which is recrystallized from acetone:hexane. The 17β-tetrahydropyran-2'-yloxy group can be restored, if desired, as set forth above.

EXAMPLE 3

To a solution of 1 g. of diisoamylborane dispersed in 50 milliliters of dioxane at −20° C. is added a steroidal solution of 1 g. of 3-methoxy-17α-(3-p-tolylsulfonyloxypropynyl)-17β-acetoxyestra-1,3,5(10)-triene dispersed in 50 milliliters of dioxane. This addition is conducted in a portionwise fashion over a period of about 30 minutes with stirring. After this time, 5 ml. of aqueous sodium hydroxide are added to the reaction mixture and after the addition the mixture is kept at −20° C. for 1 hour. The mixture is then extracted with ethyl acetate and the extracts combined and then evaporated to obtain the 3-methoxy-17α-propadienylestra-1,3,5(10)-trien-17β-ol product which can be further purified by recrystallization from acetone:hexane.

A mixture of 1 g. of 3-methoxy-17α-propadienylestra-1,3,5(10)-trien-17β-ol, 1 g. of p-toluenesulfonic acid monohydrate, 50 ml. of acetic acid and 25 ml. of acetic anhydride is allowed to stand at room temperature for 24 hours, and then is poured into water, stirred, washed with dilute sodium hydroxide solution and water, dried and evaporated to yield 3-methoxy-17α-propadienyl-17β-acetoxyestra-1,3,5(10)-triene which is recrystallized from acetone:ether.

In a similar manner, the other 17β-carboxylic acyloxy esters of the present invention are prepared, e.g., the propionates, butyrates, caproates, and so forth.

EXAMPLE 4

A solution of 1 g. of 6,6-difluoro-17α-(3-fluoropropynyl)-estr-4-en-17β-ol-3-one 3-ketal in 50 ml. of tetrahydrofuran is added over a 30 minute period to a stirred suspension of 1 g. of di-(tetramethylethyl)borane in 50 ml. of diethyl ether at 0° C. After one hour, to the mixture are added 5 ml. of aqueous sodium hydroxide. After maintaining the resultant mixture at 0° C. for 45 minutes, it is repeatedly extracted with ethyl acetate and the extracts combined and then evaporated to yield the 6,6-difluoro-17α-propadienylestr-4-en-17β-ol-3-one 3-ketal product which can be hydrolyzed to the 3-ketone.

Example 5

A solution of 1 g. of 17α-(3-bromopropynyl)-estr-5(10)-en-17β-ol-3-one 3-ketal in 50 ml. of tetrahydrofuran is added over a 30 minute period to a stirred suspension of 1 g. of 9-borabicyclo-[3.3.1]-nonane in 50 ml. of anhydrous tetrahydrofuran and this mixture is kept at −10° C. for two hours. To the mixture are added 5 ml. of aqueous potassium hydroxide and the mixture is kept at 0° C. for 1 hour. Following this time, the mixture is extracted with ethyl acetate and the extracts evaporated to yield 17α-propadienylestr-5(10)- en-17β -ol-3-one 3-ketal product which may be hydrolyzed to the 3-ketone.

EXAMPLES 6 to 16

In accordance with the methods and procedures of the present invention (including protecting reactions), the following reactions are carried out.

From 17α-(3-methylsulfonyloxypropynyl)-17β-acetoxy-18-methylandrost-4-en-3-one and diethylborane, there is obtained the 17α-propadienyl-17β-acetoxy-18-methylandrost-4-en-3-one product.

From 17α-(3-chloropropynyl)-18-ethylestr-4-en-17 β-ol-3-one and dipropyl borane, there is obtained the 17α-propadienyl-18-ethylestr-4-en-17β-ol-3-one product.

From 17α-(3-fluoropropynyl)-17β-tetrahydrofuran-2'-yloxyestra-1,3,5(10)-trien-3-ol and dibutyl borane, there is obtained the 17α-propadienyl-17β-tetrahydrofuran-2'-yloxyestra-1,3,5(10)-trien-3-ol product.

From 17α-(3-bromopropynyl)-17β-propionyloxy-18-n-propylestr-5(10)-en-3-one and dipentyl borane, there is obtained the 17α-propadienyl-17β-propionyloxy-18-n-propylestr-5-en-3-one product.

From 17α-(3-benzenesulfonyloxypropynyl)-18-isopropylestra-1,3,5(10)-triene-3,17β-diol and dihexyl borane, there is obtained the corresponding 17α-propadienyl-18-isopropylestra-1,3,5(10)-triene-3,17β-diol product.

From 3-ethoxy-17α-(3-p-tolylsulfonyloxypropynyl)-17β-propionyloxyestra-1,3,5(10)-triene and ditetramethylethylborane there is obtained the 3-ethoxy-17α-propadienyl-17β-propionyloxy-18-methylestra-1,3,5(10)-triene product.

From 17α-(3-bromopropynyl)-17β-butyryloxy-18-isopropylandrost-4-en-3-one and dioctyl borane, there is obtained the 17α propadienyl-17β-butyryloxy-18-isopropylandrost-4-en-3-one product.

From 17α-(3-chloropropynyl)-17β-acetoxy-18-methylestr-4-en-3-one and ethylpropyl borane, there is obtained the 17α-propadienyl-17β-acetoxy-18-methylestr-4-en-3-one product.

From 3-methoxy-17α-(3-ethanesulfonyloxypropynyl)-17β-tetrahydropyran-2'-yloxyestra-1,3,5(10)-triene and butylpentyl borane, there is obtained the 3-methoxy-17α-propadienyl-17β-tetrahydropyran-2'-yloxyestra-1,3,5(10)-triene product.

From 3-ethoxy-17α-(3-chloropropynyl)-estra-1,3,5(10)-triene and 9-borabicyclo-[3.3.1]-nonane, there is obtained the corresponding 3-ethoxy-17α-propadienylestra-1,3,5(10)-triene product.

From 3β,17β-diacetoxy-6,6-difluoro-17α-(3-chloropropynyl)-androst-4-ene and diisoamylborane, there is obtained the 3β,17β-diacetoxy-6,6-difluror-17α-propadienylandrost-4-ene product.

In accordance with the foregoing methods, the following compounds are prepared.

3β,17β-bis(tetrahydropyran-2'-yloxy)-6,6-difluoro-17α-propadienylestr-4-ene, 6,6-difluoro-17α-propadienyl-17β-acetoxyestr-4-en-3-one, 6,6-difluoro-17α-propadienyl-17β-propionyloxyandrost-4-en-3-one, 6,6-difluoro-17α-propadienyl-17β-benzoyloxyestr-4-en-3-one, 6,6-difluoro-17α-propadienyl-17β-adamantoyloxyestr-4-en-3-one, 3β-propionyloxy-6,6-difluoro-17α-propadienylandrost-4-en-17β-ol, 3β,17β-bis(adamantoyloxy)-6,6-difluoro-17α-propadienylestr-4-ene, 3β-(β-chloropropionyloxy)-6,6-difluoro-17α-propadienyl-17β-tetrahydrofuran-2'-xyloxyandrost-4-ene, 3β-butyryloxy-6,6-difluoro-17α-propadienyl-17β-tetrahydropyran-2'-yloxyandrost-4-ene, 3β-tetrahydrofuran-2'-yloxy-6,6-difluoro-17 α-propadienyl-17β-caproyloxyestr-4-ene, 3β-tetrahydrofuran-2'-yloxy-6,6-difluoro-17α-propadienyl-17β-caproyloxyestr-4-ene, 3β-tetrahydropyran-2'-yloxy-6,6-difluoro-17α-propadienyl-17β-heptanoyloxyandrost-4-ene, and 3β,17β-dipentanoyloxy-6,6-difluoro-17α-propadienylestr-4-ene.

Elaboration at C-3β can be performed after the principal reaction as follows.

EXAMPLE 17

A solution of 1 g. of 17α-propadienylandrost-4-en-17β-ol-3-one in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 17α-propadienylandrost-4-ene-3,17β-diol which may be further purified through recrystallization from acetone:hexane.

In like manner, the other 3-oxo derivatives bearing a 17α-propadienyl grouping prepared in accordance herewith are reduced to the corresponding 3β-hydroxyl compounds, for example, 17α-propadienylestr-4-ene-3β,17β-diol,
17α-propadienyl-17β-acetoxyestr-5-en-3β-ol,
17α-propadienyl-17β-propionyloxyandrost-4-en-3β-ol,
17α-propadienyl-17β-tetrahydrofuran-2'-yloxyestr-4-en-3β-ol,
17α-propadienyl-17β-benzoyloxyandrost-4-en-3β-ol,
17α-propadienyl-17β-adamantoyloxyestr-4-en-3βol,
6,6-difluoro-17α-propadienylestr-4-ene-3β,17β-diol, and
6,6-difluro-17α-propadienyl-17β-(β-chloropropionyloxy)-androst-4-en-3β-ol.

EXAMPLE 18

Two milliliters of dihydropyran are added to a solution of 1 g. of 17α-propadienyl-17β-caproyloxyandrost-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane to yield 3β-tetrahydropyran-2'-yloxy-17α-propadienyl-17β-caproyloxyandrost-4-ene which is recrystallized from pentane.

To a solution of 1 g. of 17α-propadienylandrost-4-ene-3β,17β-diol in 20 ml. of benzene is added 20 ml. of dihydrofuran. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5 percent aqueous sodium bicarbonate solution. The product is extracted with ethyl acetate, the organic solution is washed with water to neutral, dried over anhydrous magnesium sulfate, and evaporated to dryness under reduced pressure. The oily residue crystallizes on the addition of ether to yield the 3β,17β-bis(tetrahydrofuran-2'-yloxy)-17α-propadienylandrost-4-ene.

In like manner, the tetrahydropyranyl and tetrahydrofuranyl ethers of the 17α-propadienyl compounds hereof are prepared, for example 3β-tetrahydropyran-2'-yloxy-17α-propadienyl-17β-acetoxy-18-methylandrost-4-ene, 3β-tetrahydrofuran-2'-yloxy-17α-propadienyl-17β-heptanoyloxyestr-5(10)-ene, 3β,17β-bis(tetrahydropyran-2'-yloxy)-17α-propadienyl-18-ethylandrost-4-ene, 3β-tetrahydropyran-2'-yloxy-17α-propandienyl-17β-adamantoyloxy-18-methylestr-4-ene, and 3β,17β-bis(tetrahydropyran-2'-yloxy)-6,6-difluoro-17α-propadienyl-18-ethylandrost-4-ene.

EXAMPLE 19

A mixture of 1 g. of 17α-propadienyl-17β-acetoxyestr-4-en-3β-ol, 4 ml. of pyridine and 2 ml. of acetic anhydride is allowed to stand at room temperature for 15 hours. The mixture is then poured into ice water and the solid which forms is collected by filtration, washed with water and dried to yield 3β,17β-diacetoxy-17α-propadienylestr-4-ene which may be further purified through recrystallization from acetone:hexane.

Similarly, the corresponding 3β-esters of the other 17α-propadienyl products thereof are prepared upon substitution of the appropriate starting compound and conventional acylating agent, for example, 3β-trimethylacetoxy-17α-propadienyl-17β-acetoxyestr-4-ene, 3ββ-propionyloxy-17α-propadienylandrost-4-ene, 3β-butyryloxy--difluoro-17α-propadienyl-17β-tetrahydropyran-2'-yloxyestr-4-ene, 3β-pentanoyloxy-17α-propadienyl-17β-acetoxyestr-5(10)-ene, 3β,17β-bis(benzoyloxy)-17α-propadienylandrost-4-ene and 3β-acetoxy-6,6-difluoro-17α-propadienyl-17β-propionyloxyandrost-4-ene.

EXAMPLE 20

The corresponding C-3 substituted derivatives of the 17α-propadienyl products in the estrogen series are prepared in accordance with the above procedures using the 3β-hydroxyl derivative as starting compound. This starting compound can be formed after the principal reaction hereof upon conventional hydrolysis of the protective grouping, such as a tetrahydropyran-2'-yloxy grouping, with acid hydrolysis. Representative 3β-substituted compounds of this series thus prepared are 3-acetoxy-17α-propadienyl-17β-tetrahydrofuran-2'-yloxy-estra-1,3,5(10)-triene,
3,17β-diacetoxy-17α-propadienylestra-1,3,5(10)-triene,
3,17β-bis(benzoyloxy)-17α-propadienyl-18-ethylestra-1,3,5(10)-triene, and
3-caproyloxy-17α-propadienyl-17β-tetrahydrofuran-2'-yloxy-18-propylestra-1,3,5(10)-triene.

Further representative 6,6-difluoro-17α-propadienylandrost-4-enes and 19-nor derivatives thereof prepared in accordance with the above procedures are as follows:

3β,17β-diacetoxy-6,6-difluoro-17α-propadienyl-18-n-propylestr-4-ene,
3β,17β-diacetoxy-6,6-difluoro-17α-propadienyl-18-methylestr-4-ene,
3β,17β-diacetoxy-6,6-difluoro-17α-propadienyl-18-ethylandrost-4-ene,
3β,17β-dipropionyloxy-6,6-difluoro-17α-propadienylestr-4-ene,
3β,17β-dipropionyloxy-6,6-difluoro-17α-propadienyl-18-methylandrost-4-ene,
3β,17β-bis(tetrahydropyran-2'-yloxy)-6,6-difluoro-18-isopropylestr-4-ene,
3β,17βbis(tetrahydropyran-2'-yloxy)-6,6-difluoroandrost-4-ene,
3β,17β-bis(tetrahydrofuran-2'-yloxy)-6,6-difluoro-18-ethylandrost-4-ene,
3β,17β-bis(tetrahydrofuran-2'-yloxy)-6,6-difluoroestr-4-ene,
6,6-difluoro-17α-propadienyl-17β-propionyloxyestr-4-en-3-one,
6,6-difluoro-17α-propadienyl-17β-butyryloxyandrost-4-en-3-one,
6,6-difluoro-17α-propadienyl-17β-pentanoyloxyestr-4-en-3-one,
6,6-difluoro-17α-propadienyl-17β-hexanoyloxyestr-4-en-3-one,
6,6-difluoro-17α-propadienyl-17β-heptanoyloxyandrost-4-en-3-one, 6,6-difluoro-17α-propadienyl-17β-caproyloxyandrost-4-en-3-one, 6,6-difluoro-17α-propadienyl-17β-benzoyloxyestr-4-en-3-one, 6,6-difluoro-17α-propadienyl-17β-adamantoyloxyandrost-4-en-3-one, 6,6-difluoro-17α-propadienyl-17β-(β-chloropropionyloxy)-estr-4-en-3-one, 6,6-difluoro-17α-propadienyl-17β-trimethylacetoxyestr-4-en-3-one, 6,6-difluoro-17α-propadienyl-18-methylestr-4-en-17β-ol-3-one, and 6,6-difluoro-17α-propadienyl-17β-acetoxy-18-methylestr-4-en-3-one.

What is claimed is:

1. The method which comprises treating a 17α-(3-substituted propynyl) steroid, wherein the substituent is halo, alkylsulfonyloxy or arylsulfonyloxy, together with a dialkylborane or 9-borabicyclo-[3.3.1]-nonane, followed by base treatment, whereby to provide the corresponding 17α-propadienyl compound of one of the following formulas:

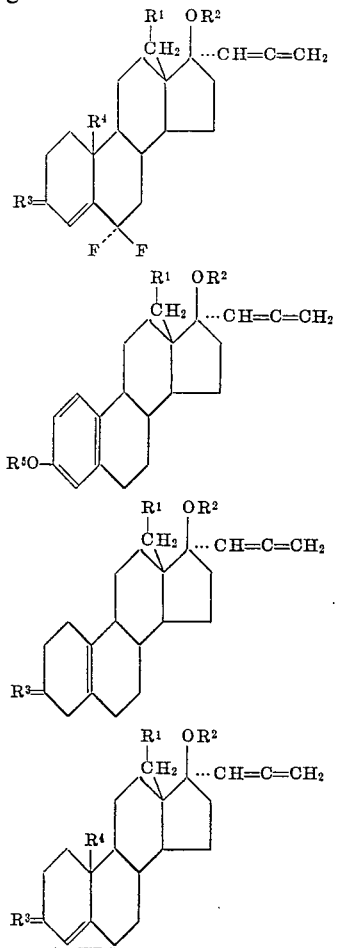

wherein,

R¹ is hydrogen or lower alkyl of from one to three carbon atoms, inclusive;

R² is hydrogen, tetrahydrofuran-2-yl, tetrahydropyran-2-yl, or a carboxylic acyl group containing less than 12 carbon atoms;

R³ is an oxo group or the group

is hydrogen, tetrahydrofuran-2-yl, tetrahydropyran-2-yl, or a carboxylic acyl group containing less than 12 carbon atoms;

R⁴ is hydrogen or methyl; and

R⁵ is hydrogen, lower alkyl of from one to eight carbon atoms, inclusive, cycloalkyl, tetrahydrofuran-2-yl, tetrahydropyran-2-yl, or a carboxylic acyl group containing less than 12 carbon atoms.

2. The method claimed in claim 1 wherein diisoamylborane, ditetramethylethylborane, or 9-borabicycle-[3.3.1]-nonane is employed.

3. The method claimed in claim 2 wherein the dialkylborane is diisoamylborane.

4. The method claimed in claim 1 conducted in inert, organic liquid reaction medium.

5. The method claimed in claim 4 wherein the organic liquid reaction medium is tetrahydrofuran.

6. The method claimed in claim 4 conducted at a temperature of from about −70° C. to about 20° C.

7. The method claimed in claim 6 conducted at a temperature of from about −20° C. to about 0° C.

8. The method claimed in claim 1 wherein the dialkylborane or 9-borabicyclo[3.3.1]-nonane is employed in at least chemical equivalent amounts with the 17α-(3-substituted propynyl) steroid.

9. The method claimed in claim 1 wherein said 17α-(3-substituted propynyl) steroid is a 17α-(3-chloropropynyl)-steroid.

10. The method claimed in claim 1 wherein 17α-propadienylestr-4-en-17β-ol-3-one is prepared.

11. The method claimed in claim 1 wherein a 6,6-difluoro-17α-propadienylestr-4-ene or a 6,6-difluoro-17α-propadienylandrost-4-ene steroid is prepared.

12. The method claimed in claim 1 wherein 6,6-difluoro-17α-propadienylestr-4-en-17β-ol-3-one is prepared.

13. The method claimed in claim 1 wherein 6,6-difluoro-17α-propadienyl-18-methylestr-4-en-17β-ol-3-one is prepared.

* * * * *